United States Patent [19]

Hill

[11] Patent Number: 4,876,817
[45] Date of Patent: Oct. 31, 1989

[54] BOW-MOUNTABLE BLIND

[76] Inventor: Troy D. Hill, Box 146, Farley, Mo. 64028

[21] Appl. No.: 209,074

[22] Filed: Jun. 17, 1988

[51] Int. Cl.$^4$ .............................................. A01M 31/00
[52] U.S. Cl. ..................................... 43/1; 124/23 R; 124/86; 428/919
[58] Field of Search .................... 43/1; 124/86, 23 R; 135/900, 901; 428/919; 89/36.01, 36.04, 36.06

[56] References Cited

U.S. PATENT DOCUMENTS

| | | | |
|---|---|---|---|
| 3,069,796 | 12/1962 | Ruter | 428/919 |
| 3,179,102 | 4/1965 | Peckham | 124/23 R |
| 4,615,921 | 10/1986 | Johansson | 428/919 |
| 4,817,579 | 4/1989 | Mathias | 43/1 |

Primary Examiner—Gene P. Crosby
Attorney, Agent, or Firm—Hovey, Williams, Timmons & Collins

[57] ABSTRACT

An archery bow-mountable blind is provided which effectively camouflages the movements of the archer, bowstring, and arrow as the bow is being drawn while providing sufficiently clear observation of the target for accurate aiming. The preferred apparatus includes a sheet of camouflage material, a pair of support members for supporting the sheet therebetween, and a pair of attachment straps for coupling the support members to a bow. The camouflage sheet has a plurality of cuts defined therethrough forming a corresponding plurality of flaps and openings. The flaps simulate foliage thereby enhancing the camouflage effect of the apparatus and the openings provide clear observation of the target. The preferred support members are shiftable between extended positions in which the members are generally transverse to the bow's long axis and collapsed positions in which the members are generally aligned with the bow's long axis.

8 Claims, 1 Drawing Sheet

BOW-MOUNTABLE BLIND

BACKGROUND OF THE INVENTION

1. Field of the Invention

The present invention relates to a blind or camouflage apparatus for mounting to an archery bow. More particularly, the present invention relates to a blind including a sheet of camouflage material having a plurality of cuts defined therethrough forming a corresponding plurality of flaps which simulate foliage and openings which allow clear observation by an archer using a bow to which the blind is mounted.

2. Background of the Prior Art

In the sport of archery hunting, it is common to use a blind in order to conceal the presence and movement of the archer. The blind is typically set up adjacent a game trail and the archer waits behind or within the blind for quarry to happen by. The blind disguises the presence of the archer and also disguises the archer's movements especially when drawing the bow inasmuch as game animals are typically more cognizant of movement then the actual silhouette of the archer.

Some game animals, however, do not necessarily travel along game trails and accordingly the archer must move about in search of the game. In order to avoid detection by the quarry, it is advantageous for the archer to use a portable blind which is desirably coupled to the bow itself in order to effectively camouflage the silhouette of the archer and the bow, and to camouflage the movements of the archer, bow, and arrow when the bow is being drawn.

A typical prior art bow-mountable blind includes a sheet of camouflage material, a pair of spaced-apart, elongated parallel rods suspending the camouflage material therebetween, and straps for coupling the rods to the face of the bow. The camouflage material is typically composed of an open-weave fabric having a camouflage pattern imprinted thereon. The material includes a central opening through which the arrow extends. The open-weave nature of the prior art camouflage material is intended to allow the archer to observe the target therethrough while the camouflage pattern prevents the quarry from detecting the archer's silhouette and movement. The open-weave nature of the camouflage sheet, however, prevents clear observation of the target especially in dimly lighted situations. Furthermore, the camouflage pattern imprinted on the material may not be totally natural in simulating foliage and other natural structures.

Additionally, typical print art bow-mountable blinds present an inconvenience in that while traveling, the blind must be detached from the bow to keep it from catching on branches on so forth, and then reattached when game is detected in the vicinity. The delay time encountered in reconnecting the blind to the bow may provide sufficient time for the quarry to escape.

SUMMARY OF THE INVENTION

The present invention solves the problems as outlined above. That is to say, the invention hereof provides for a bow-mountable blind or camouflage apparatus which provides the archer with a clear view of the target, more naturally simulates foliage and the like, and is quickly shifted to a collapsed position during travel and just as quickly extended to an extended position for effective use.

The preferred bow-mountable blind includes a camouflage unit having a sheet of flexible camouflage material and support structure for coupling with the sheet, and means for attaching the unit to the bow. The camouflage sheet includes structure defining a plurality of separate cuts therethrough forming a plurality of integral flaps and a corresponding plurality openings through the sheet. The flaps, when extended away from the openings, simulate leaves and enhance the camouflage effect of the sheet. The preferred support structure includes a pair of elongated, spaced-apart, parallel support members supporting the camouflage sheet therebetween. The support members each include shifting means for allowing selective respective shifting of the members between an extended position in which the members are generally transverse to the long axis of the bow, and a collapsed position in which the members are generally aligned with the bow axis.

In preferred forms, each flap presents a base whereby each is connected to the remaining portion of the camouflage sheet and which allows the flap to be folded therealong in order to expose the opening. Each flap also presents a distal portion separated from a opposed portion of the sheet by a respective one of the cuts. Preferably, the flaps are oriented such that a strain placed on the sheet in a direction generally aligned with the long axes of the flaps causes the distal portions to separate from the opposed portions in order to expand the openings.

Other the preferred aspects of the present invention will become clear from the detailed description hereinbelow.

BRIEF DESCRIPTION OF THE DRAWING FIGURES

DETAILED DESCRIPTION OF THE PREFERRED EMBODIMENT

Figure 4:
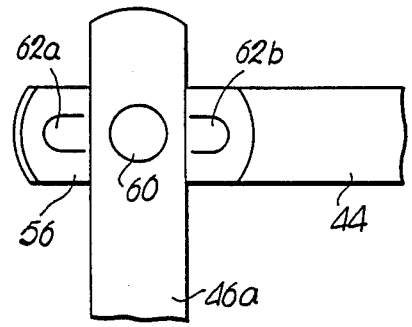
FIG. 4 is a partial elevational view of a pivot structure of one of the support members illustrated in the collapsed position.

With reference to the drawing figures, preferred bow-mountable blind 10 broadly includes camouflage unit 12 and attachment structure 14. Camouflage unit 12 broadly includes camouflage sheet 16 and support structure 18.

Camouflage sheet 16 is preferably composed of a rectangular sheet of vinyl presenting opposed faces with each face having a different camouflage pattern imprinted thereon. The reversible and replaceable nature of the sheet 16, as will be explained further hereinbelow, allows the archer to select the camouflage pattern most effective for the season, terrain, and surroundings.

Figure 6:
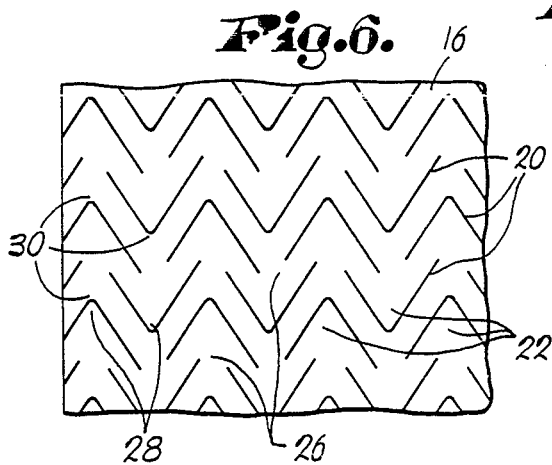
FIG. 6 is a partial elevational view of the camouflage sheet illustrating the cuts forming the flaps of the camouflage sheet with the flaps in place over the openings.

Turning now to FIG. 6, camouflage sheet 16 includes a plurality of chevron-shaped cuts 20 defined therethrough. Cuts 20 are arranged in a plurality of rows with the cuts in each row being oriented in the same direction. The cuts in adjacent rows are oriented in the opposite direction to produce the cut pattern as shown in FIG. 6.

Figure 1:
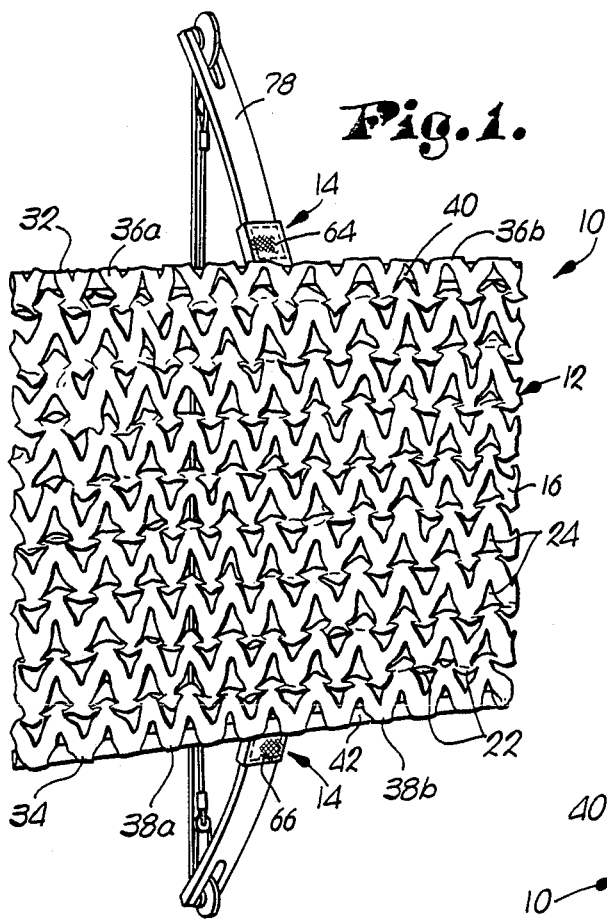
FIG. 1 illustrates the bow-mountable blind coupled with an archery bow.
Figure 7:
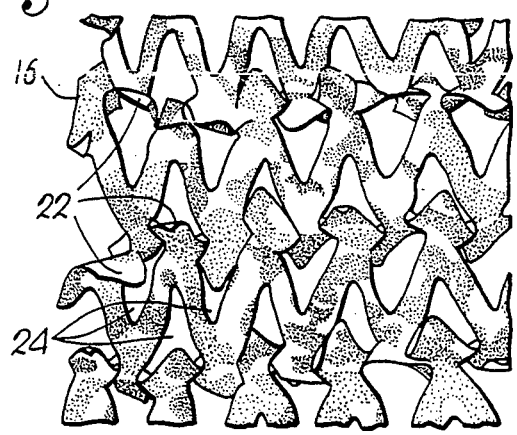
FIG. 7 is a partial plan view of the camouflage sheet showing the flaps adjusted to simulate foliage leaves and showing the openings exposed thereby.

Each cut 20 in camouflage sheet 16 forms a respective flap 22 covering a corresponding respective opening 24 (see FIGS. 1 and 7).

Each flap 22 presents base portion 26 whereby each flap 22 is coupled with the remaining portion of camouflage sheet 16, and a distal portion 28 opposite base portion 26. Cuts 20 also form opposed portions 30 which is that portion of sheet 16 adjacent a respective cut and opposite a corresponding distal portion 28. That is to say, distal portions 28 are separated from their corresponding opposed portions 30 by respective cuts 20.

In use, and when a strain is placed on camouflage sheet 16 in a direction parallel to the respective long axes of flaps 22, that is, in a direction parallel to the directions in which cuts 20 point, distal portions 28 separate from opposed portions 30 thereby expanding openings 24.

In preferred use, flaps 22 are randomly folded along respective base portions 26 to present the appearance of foliage leaves as illustrated in FIGS. 1 and 7 and to expose openings 24. That is to say, flaps 22, when folded outwardly from the face of camouflage sheet 16, effectively simulate leaves which enhances the camouflage effect of the camouflage pattern imprinted on sheet 16.

Camouflage sheet 16 also presents respective upper and lower edges 32 and 34. The fabric adjacent edges 32, 34 is preferably sewn, or additional fabric added, to form respective pairs of support sleeves 36a,b and 38a,b associated with each edge 32, 34. That is to say, upper sleeves 36a,b are aligned and centrally spaced-apart adjacent upper edge 32, and lower sleeves 38a,b are aligned and centrally spaced-apart adjacent lower edge 34. Sleeves 36a,b and 38 a,b are used to couple with support structure 18 for support of camouflage sheet 16.

Support structure 18 includes upper and lower elongated support members 40 and 42. Members 40, 42 are preferably composed of lightweight wood, synthetic resin material, or lightweight metal such as aluminum as a matter of design choice.

Upper support member 40 includes center section 44 and respective left and right end sections 46a,b. Similarly, lower support member 42 includes lower center section 48 and respective lower end sections 50a,b.

Support structure 18 includes shifting means preferably embodied as upper and lower pivot structures. Upper pivot structures 52a,b respectively couple the inboard ends of upper end sections 46a,b with the respective outboard ends of upper center section 44. Similarly, lower pivot structures 54a,b respectively couple the inboard ends of lower end sections 50a,b with the respective outboard ends of lower center section 48.

Figure 5:
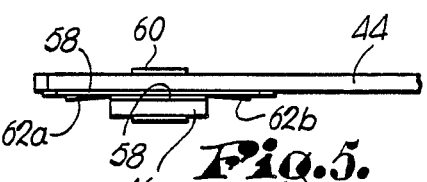
FIG. 5 is a plan view of the pivot structure of FIG. 4.

FIG. 4 and 5 illustrate pivot structure 52a which is typical of all four pivot structures. In FIGS. 4 and 5, upper end section 46a is illustrated in the collapsed position of blind 10 which will be explained further hereinbelow.

Conventional pivot structure 52a includes leaf spring fixture 56, detent fixture 58, and pivot pin 60. The associated ends of upper center section 44 and upper end section 46 are inset or routed so that they overlap and present respective flush surfaces. Leaf spring fixture 56 is mounted to the recessed end of upper center section 44 and detent fixture 58 is mounted to the recessed portion of upper end section 46a. Pivot pin 60 is configured in a manner similar to a rivet and pivotally joins respective ends of sections 44 and 46a such that when the sections are axially aligned with one another, leaf springs 62a,b, included as part of fixture 56, are respectively received within corresponding detents (not shown) in fixture 58 thereby holding sections 44 and 46a in alignment. In the position shown in FIGS. 4 and 5, the friction fit between pivot pin 60 and the ends of 44 and 46a hold the sections in the positions as shown.

Figure 2:
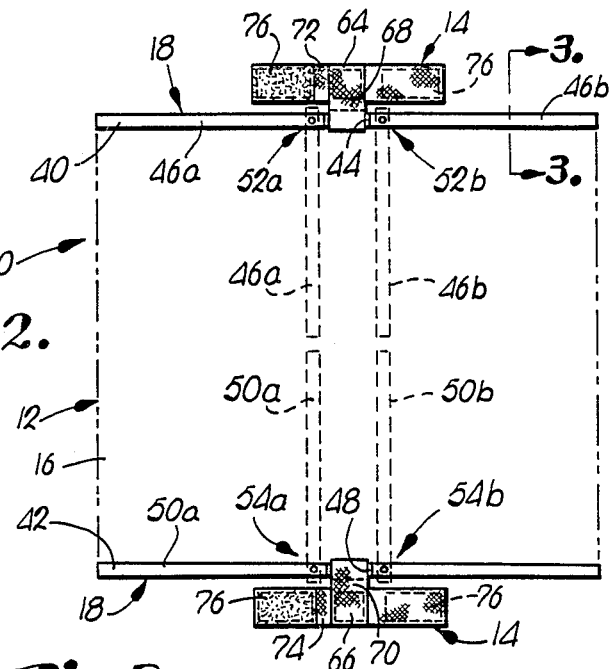
FIG. 2 is a view of the blind hereof with the camouflage sheet in phantom, showing the support members in the extended position, and illustrating the collapsed position thereof in dashed lines.
Figure 3:
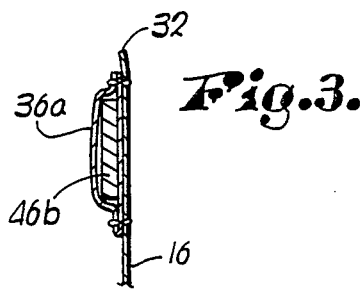
FIG. 3 is a partial sectional view taken along line 3-13 3 of FIG. 2.

FIG. 2 illustrates blind 10 in the extended position wherein end sections 46a,b and 50a,b are respectively aligned with center sections 44, 48 which results in end sections 46a,b and 50a,b being generally transverse to the long axis of the bow to which blind 10 is attached. The dashed lines of FIG. 2 illustrate the collapsed position for blind 10 in which end sections 46a,b and 50a,b are respectively pivoted about pivot structures 52a,b and 54a,b into general alignment with the long axis of the bow. Thus, pivot structures 52a,b and 54a,b allow selective shifting of support members 40, 42 and thus blind 10 between extended and collapsed positions.

In order to couple camouflage sheet 16 with support structure 18, upper sleeves 36a,b and lower sleeves 38a,b receive upper end sections 46a,b and lower end sections 50a,b respectively. This is best accomplished when the respective end sections are shifted to a position about midway between the extended and collapsed positions. In this midway position, the sleeves can easily be slipped over their associated end sections. Easily removable tape or the like is preferably used to prevent sleeves 36a,b and 38a,b from slipping off respective end sections 46a,b and 50a,b.

With the preferred structure of camouflage sheet 16 support structure 18 as explained above, sheet 16 can be easily removed therefrom and turned around to present the other camouflage face of sheet 16 as desired to more closely match the terrain, foliage, and season. Just as conveniently, other camouflage sheets 16 having different camouflage patterns 16 thereon can conveniently and quickly replace an existing camouflage sheet when desired.

Preferred attachment structure 14 includes a pair of attachment members 64 and 66. Each member 64, 66 includes a respective attachment loop 68, 70 and attachment strap 72, 74. Attachment members 64, 66 are preferably composed of nylon and also have a camouflage pattern thereon. Each loop 68, 70 is designed to respectively loop about center sections 44, 48. Attachment straps 72, 74 are respectively sewn to loops 68, 70 remote from end sections 44, 48 as illustrated in FIG. 2. Straps 72, 74 include respective hook-and-eye fastener strips (such as VELCRO) sewn thereto on opposed faces as illustrated in FIG. 2.

In the use of the bow-mountable blind 10, camouflage sheet 16 is coupled with support structure 18 as explained above. Blind 10 is then coupled with bow 78 by wrapping attachment straps 72, 74 held respectively therearound which are releasably in place by hook-and-eye fasteners 76. When coupled with bow 78, blind 10 presents the configuration as shown in FIG. 1. In this configuration, the movement of an archer therebehind when drawing the bow and the associated movements of the bow string and arrow are effectively camouflaged from view. Flaps 22 enhance the camouflage effect of the camouflage pattern on sheet 16 so that even with openings 24 through sheet 16, the archer and associated movements are still effectively camouflaged. Openings 24 are sufficient in size and number to provide clear observation by the archer of the target thereby allowing for effective aiming.

As those skilled in the art will appreciate, flaps 22, by simulating leaves, provide effective camouflaging movement of the archer even if such movement results in slight movement of blind 10 itself. That is to say, the movement of blind 10 would correspond to natural movement of foliage and leaves and would not be so likely to alert the quarry.

When the archer is ready to move to another location, blind 10 can be quickly shifted to the collapsed position as explained above by pivoting upper end sections 46a,b downwardly about pivot structures 52a,b, and by pivoting lower end sections 50a,b upwardly about respective lower pivot structures 54a,b. In the collapsed configuration, sections 46a,b and 50a,b are generally aligned with the long axis of bow 78 for compact storage and easy transport and thereby minimize the possibility that blind 10 might catch or snag on underlying foliage.

Additionally, the collapsible feature of blind 10 allows it to be compactly stored without the need for detaching it from bow 78. In the event the archer spots quarry or otherwise wishes to place blind 10 in the extended and ready position, the archer can quickly and readily shift sections 46a,b and 50a,b to their extended positions with one hand while holding bow 78 with the other hand.

As those skilled in the art will appreciate, the present invention contemplates many variations in the preferred embodiment herein described. For example, support members 40, 42 can be configured to present a single pivot point each whereby each member rotates about this pivot point to place the bow-mountable blind in the collapsed position for transport. Additionally, flaps 22 can be configured in a variety of shapes as desired. As a final example, camouflage sheet 16 can be configured of other materials such as burlap, canvas, or nylon as a matter of design choice.

Having thus described the preferred embodiment of the present invention, the following is claimed as new and desired to be secured by Letters Patent:

1. A bow-mountable blind comprising:
    a camouflage unit including
    a sheet of camouflage material, and support structure for coupling with said supporting said sheet,
    -said support structure including a pair of respective elongated support members for supporting said sheet therebetween, and shifting means for allowing shifting of said members between an extended position wherein said members are generally transverse to the long axis of the bow and a collapsed position in which said members are generally aligned with the long axis of the bow; and
    attachment means for attaching said unit to the bow, said sheet having structure defining a plurality of separate cuts therethrough forming a plurality of integral flaps and allowing shifting of said flaps in order to expose respective corresponding openings through said sheet such that said openings allow an archer holding the bow with said blind attached thereto to see through said opeinings and allow an arrow to extend therethrough.

2. The blind as set forth in claim 1, each of said flaps presenting a base whereby each flap is connected to the remaining portion of said sheet and a distal portion separated from an opposed portion of said sheet by a respective one of said cuts, said flaps presenting respective parallel axes extending respectively through said bases and distal portions, said flaps and cuts being oriented such that a strain placed on said sheet in a direction generally aligned with said axes causes said respective distal portions to separate from said corresponding opposed portions thereby exposing at least a portion of said openings.

3. The blind as set forth in claim 1, each of said flaps presenting a base whereby each flap is connected to the remaining portion of said sheet, said base allowing said flap to be generally folded therealong in order to expose said corresponding opening.

4. The blind as set forth in claim 1, said material being composed of vinyl material having a camouflage pattern thereon.

5. The blind as set forth in claim 1, each of said members including a center section and respective opposed end sections, said shifting means including pivot means for pivotally coupling each of said end sections with the respective corresponding center section for allowing selective pivotal shifting of said end sections between said extended and collapsed positions.

6. The blind as set forth in claim 1, said sheet including a pair of opposed faces having respective camouflage patterns thereon, said support structure including means for selectively reversing the relative positions of said faces.

7. A bow-mountable blind comprising:
    a camouflage unit including
    a sheet of flexible camouflage material, and
    support structure for coupling with and supporting said sheet; and
    attachment means for attaching said unit to the bow, said support structure including a pair of spaced-apart, elongated, support members for supporting said sheet therebetween,
    said support structure further including shifting means for selectively shifting said support members between respective extended positions in which said support members are generally transverse to the long axis of the bow and respective collapsed positions in which said support members are generally aligned with the long axis of the bow.

8. The blind as set forth in claim 7, each of said members including
    a center section,
    a pair of respective opposed end sections, and
    means pivotally coupling each of said end sections respectively with said center section.

* * * * *